United States Patent
Descoqs et al.

(10) Patent No.: US 10,754,333 B2
(45) Date of Patent: Aug. 25, 2020

(54) METHOD FOR MONITORING THE OPERATION OF A TURBOMACHINE

(71) Applicant: Safran Aircraft Engines, Paris (FR)

(72) Inventors: Augustin Marie Michel Descoqs, Moissy-Cramayel (FR); Denis Thierry Sauvage, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 375 days.

(21) Appl. No.: 15/531,781

(22) PCT Filed: Dec. 1, 2015

(86) PCT No.: PCT/FR2015/053284
§ 371 (c)(1),
(2) Date: May 31, 2017

(87) PCT Pub. No.: WO2016/087770
PCT Pub. Date: Jun. 9, 2016

(65) Prior Publication Data
US 2017/0269581 A1    Sep. 21, 2017

(30) Foreign Application Priority Data

Dec. 2, 2014 (FR) .................................. 14 61777

(51) Int. Cl.
G05B 23/02 (2006.01)
(52) U.S. Cl.
CPC ..... G05B 23/0275 (2013.01); G05B 23/0243 (2013.01); G05B 23/0248 (2013.01); G05B 23/0278 (2013.01); G05B 23/0283 (2013.01)
(58) Field of Classification Search
None
See application file for complete search history.

(56) References Cited

U.S. PATENT DOCUMENTS

| | | | |
|---|---|---|---|
| 2004/0088991 A1* | 5/2004 | Gallant | G05B 9/03 60/772 |
| 2008/0133178 A1* | 6/2008 | Byrne | G05B 23/0235 702/184 |
| 2008/0177515 A1 | 7/2008 | Saintis | |

FOREIGN PATENT DOCUMENTS

FR    2 910 986 A1    7/2008

OTHER PUBLICATIONS

Reliability Analysis Center, "Failure Mode, Effects, and Criticality Analysis (FMECA)", 1993, 127 pages. (Year: 1993).*

(Continued)

*Primary Examiner* — Suzanne Lo
(74) *Attorney, Agent, or Firm* — Oblon, McClelland, Maier & Neustadt, L.L.P.

(57) ABSTRACT

A method for monitoring the operation of a turbomachine controlled by a digital control system including at least one component, includes acquiring operating state information relating to the state of at least one component; determining, depending on the state information acquired, a current degraded configuration in which at least one of the components has failed; determining a classification of the current degraded configuration using at least one classification table stored in a storage device, the classification tables associating with at least one degraded configuration one classification expressing the level of criticality of the degraded configuration, the tables being obtained by calculating a conditional probability of a predefined anticipated event from the probability of occurrence of elementary events relating to a failure of one of the components; and estimating an operating time permitted for the turbomachine depending on the classification determined for the current degraded configuration.

9 Claims, 10 Drawing Sheets

(56) References Cited

OTHER PUBLICATIONS

International Search Report dated Mar. 17, 2016 in PCT/FR2015/053284 (with English translation).
Search Report dated Jul. 30, 2015 in French Patent Application No. 1461777 (with English translation of categories of cited documents).
Marvin Rausand, "Chapter 3, System Analysis, Failure Modes, Effects, and Criticality Analysis" System Reliability Theory, Second Edition, XP055205431, 2005, pp. 1-46.

* cited by examiner

METHOD FOR MONITORING THE OPERATION OF A TURBOMACHINE

GENERAL TECHNICAL FIELD

The object of the invention is the field of safety of operation, and relates more specifically to a method for evaluating the criticality of failures, notably applicable to an aircraft.

STATE OF THE ART

The pieces of equipment of an aircraft may be subject to different failures leading the aircraft to be found in a degraded operational configuration. Such a configuration may, depending on the type of ascertained failure, have a more or less significant risk for the integrity of passengers of the aircraft. The digital regulation system of the aircraft should therefore be able to determine for each potential degraded configuration the incurred risk and infer therefrom whether the aircraft may be allowed to continue its flight or not. In order to characterize the incurred risk, the regulation system may for example determine the probability, in the current degraded configuration, of the occurrence of a feared event such as Loss of Thrust Control (LOTC). Depending on the value of such a probability, the current degraded configuration may be classified in a given operational category wherein a certain operation time remains allowed. The more the probability of the feared event increases, the more the current degraded configuration will be classified in a category allowing a short operation time, until the immediate stopping of the aircraft is required in the highest category.

In order that such a method for handling the safety of operation be efficient, it is necessary to determine for each potential degraded configuration, i.e. for each combination of one or several possible failures, the probability of occurrence of the feared event. Now the complexity for calculating such probabilities increases exponentially with the number of failures taken into account. Further, the different failures may affect an aircraft which may have common failure modes. Such failures can no longer be considered as independent events in terms of probability.

The present methods for calculating such probabilities, such as the methods with truncation of minimum sections or binary decision diagrams, does only achieve a calculation of such probabilities only for the degraded configurations having such a failure. The probability of occurrence of the feared event for the configurations having multiple failures is then generally estimated in a very conservative way depending on qualitative considerations such as the presence or not of failures affecting both routes of the regulation system. Further, the different possible failures may be considered as independent events in the algorithms for calculating probability, thus neglecting the common failure modes. Such estimation methods thus lead to over evaluation of the probability of occurrence of the feared event, and therefore to requiring a stopping of the aircraft within much shorter delays than those actually necessary. This may for example lead in the case of multiple failures for which the combination has a low criticality, to preventing the re-takeoff of an aircraft and to requiring a maintenance operation in a premature way while the aircraft still has a safety level of operation quite compatible with a prolongation of the flight time. Finally, the existing calculation methods require repeated application, for each degraded configuration to be taken into account, and thus have a significant consumption of computation resources.

Therefore there exists a need for a method for evaluating the criticality of failures giving the possibility of exactly calculating the probability of occurrence of a feared event for a plurality of possible failures, including for degraded configurations having multiple failures, in a reduced computing time, in order to only require an interruption of the availability of the aircraft for maintenance only within strictly required delays.

PRESENTATION OF THE INVENTION

The present invention thus relates to, according to a first aspect to a method for monitoring the operation of a turbomachine controlled by a digital regulation system comprising at least one component, characterized in that a system for monitoring the operation applies the steps of:
  acquiring information on the operative state relative to the state of at least one component;
  determining from the acquired state information a current degraded configuration wherein at least one of said components is faulty;
  determining a classification of said current degraded configuration by means of at least one classification table stored in a storage device, said classification tables associating with at least one degraded configuration, a classification expressing the criticality level of said degraded configuration, said tables being obtained by computing a conditional probability of a feared event predefined from the probability of occurrence of elementary events relating to a failure of one of said components,
  estimating an allowed operation time of said turbomachine according to said classification determined for said current degraded configuration,
  said method being further characterized:
  in that the step for obtaining the classification tables associating one classification with each degraded configuration of a predefined set of degraded configurations is applied beforehand off-line and comprises:
    the modeling of a tree of failures representing possible logic combinations of events leading to the achievement of said predefined feared event (LOTC), the leaves of the tree representing said elementary events,
    for each degraded configuration of said predefined set:
      calculating, from the probability of occurrence of elementary events, the conditional probability in said degraded configuration of said predefined feared event,
      the association in one of said tables of one classification with said degraded configuration according to the calculated conditional probability,
  and in that the calculation of the conditional probability of the predefined feared event in a degraded configuration comprises:
    for each event of the tree of failures representing a logic combination of events, sons of the tree, the determination of a first formula expressing the probability of this event according to said son events, the identification of repeated elementary events in the tree from among said son events and the determination of a second formula, a so called factored out formula, by factorization of said first formula according to the identified repeated elementary events, each factorization term of said factorized formula, only depending on independent events of the factor with which it is associated,
    the identification in the tree of events achieved in said degraded configuration, the calculation of the conditional probability of the predefined feared event in said degraded configuration from which said factorized formulae, of the identified achieved events, and from probabilities of elementary events.

Such a method gives the possibility of estimating the criticality level of the current configuration from an exact calculation of the conditional probability of the feared event in this degraded configuration. Further, the application of the step for obtaining the classification tables associating one classification with each degraded configuration of an predefined set of degraded configurations gives the possibility of efficiently calculating the probability of occurrence of the feared event from known probabilities of the elementary events and infer therefrom the classification to be assigned to each possible degraded configuration. Such a factorization further gives the possibility of greatly simplifying the expressure of such formulae and the calculation of the probabilities of the events of the tree resulting from the combination of multiple elementary events, without neglecting the taking into account of the possible interdependencies between the different branches of the tree.

The method according to the first aspect may further comprise the application of at least one maintenance operation when the allowed operating time is less than a predetermined threshold.

Such an application gives the possibility of only triggering a maintenance operation when the system has failures really requiring it.

The factorized formulae may moreover be truncated.

Such a truncation gives the possibility of simplifying the expressure of the formulae without substantially modifying the value of the computed probabilities.

The step for calculating the conditional probability in a degraded configuration of the predefined feared event, may comprise, for an identified achieved event, the calculation of a conditional probability in said degraded configuration of at least one repeated elementary event in the tree from among the son events of said achieved event, by means of the factorized formula corresponding to said achieved event.

Such an application mode gives the possibility of reevaluating the probability of certain elementary events by taking into account the events actually achieved in a given degraded configuration.

In a first application mode, said storage device comprising a first number of classification tables and for each of these tables, all the configurations of a table comprising the same number of faulty components, the step for determining a classification of said current degraded configuration, wherein a plurality of components, so called current faulty components, are faulty, comprises the search, from among said tables, by covering the latter in an increasing order of the number of faulty components, of the degraded configuration associated with a classification expressing a set maximum criticality level wherein the smallest number of components from among the current faulty components are faulty.

Such a first application mode gives the possibility of only covering a limited number of tables of reduced size when a reduced number of faulty components of the sought configuration in the tables is sufficient for associating this configuration with the highest criticality level.

In a second application mode, said storage device comprising a first number of classification tables and for each of these tables all the configurations of a table comprising the same number of faulty components, the step for determining a classification of said current degraded configuration, wherein a plurality of components, so called current faulty components, are faulty, comprises the determination of the classification associated with the current degraded configuration in the table associating a classification with degraded configurations comprising the same number of faulty components as the number of current faulty components.

The classification of the current degraded configuration may thus be found in the adequate table dedicated to the configurations having the same number of faulty components as the current configuration.

Said plurality of components may at least comprise two faulty components, for example two faulty components.

During the step for determining a classification of said current degraded configuration if none of said tables associates a classification to the current degraded configuration, the classification expressing a maximum criticality level may be associated with said current degraded configuration.

This gives the possibility of assigning a conservative classification to the current classification in the case of lack of information in the available tables.

According to a second aspect, the invention relates to a computer program product comprising code instructions for executing a method according to the first aspect when this program is executed by a processor.

According to a third aspect, the invention relates to a system for monitoring the operation of a turbomachine controlled by a digital regulation system (FADEC) comprising at least one component, characterized in that it is configured for applying the steps of the monitoring method according to the first aspect and in that it comprises:
- a module for acquiring information on the operational state relative to the state of said at least one component,
- a storage device storing at least one classification table associating with at least one degraded configuration, a classification expressing the criticality level of said degraded configuration, said tables being obtained by calculating a conditional probability of a predefined feared event (LOTC) from the probability of occurrence of elementary events relative to a failure of one of said components,
- a module for detecting a failure in order to determine from the acquired state information a current degraded configuration wherein at least one of said components is faulty,
- a calculation module for determining a classification of said current degraded configuration by means of said stored classification tables, and for estimating an authorized operational time of said turbomachine, depending on said determined classification of said current degraded configuration.

Such computer program products and monitoring system have the same advantages as those mentioned for the method according to the first aspect.

PRESENTATION OF THE FIGURES

Other features and advantages will become apparent upon reading the description which follows of an embodiment. This description is given with reference to the appended drawings wherein.

DETAILED DESCRIPTION

Figure 1:
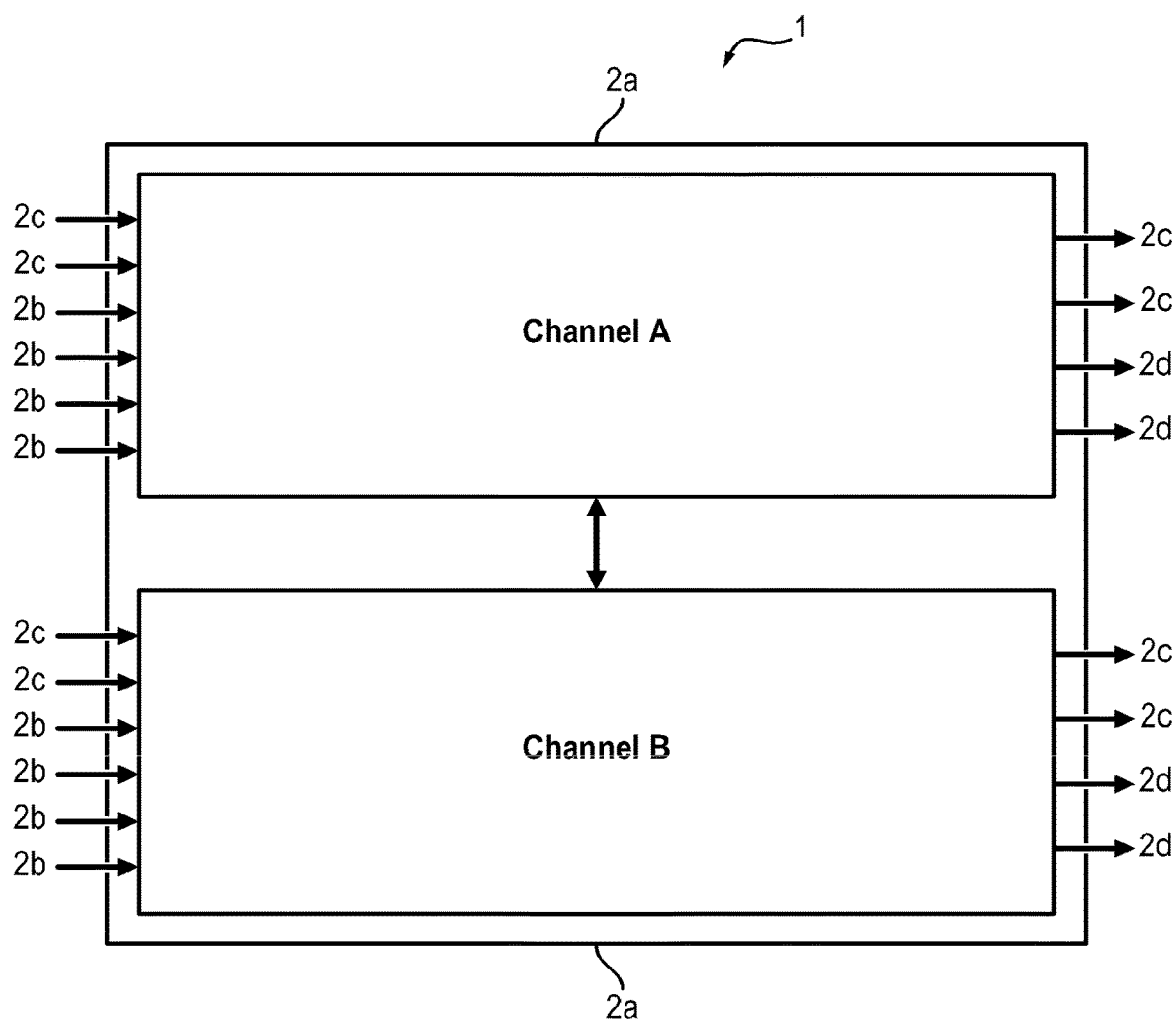
FIG. 1 illustrates an example of an architecture of a digital regulation system of the FADEC type for applying the method according to the invention.

With reference to FIG. 1, an embodiment for the invention relates to a method for monitoring the operation of a turbomachine of an aircraft controlled by a digital regulation system 1 of the FADEC ("Full Authority Digital Engine Control") type, comprising at least one component.

Such a digital regulation system notably comprises electronic components of computers 2a distributed between two routes A and B. The regulation system also comprises sensors 2b measuring various physical parameters of the turbomachine such as the speed of the high pressure turbine (HP) (N2) or low pressure turbine (BP) (N1), the pressure at the output of the compressor or the temperature at the turbine inlet. The signals sent to the computers by these sensors are used by the latter jointly with data from the transmission bus of data 2c, such as the ARINC buses, for determining permanently the state of the turbomachine.

The regulation system also comprises actuators 2d, such that the actuators for adjusting the stators of the high pressure compressor ("Variable Stator Vane" VSV) or for dosing the fuel ("Fuel metering valve" FMV), controlled by the computers for ensuring regulation of the turbomachine.

These components of the regulation system may be affected by more or less serious failures, which may affect the capability of the system of correctly ensuring the regulation of the turbomachine. The system is then found in a degraded configuration. Such failures should therefore be detected and taken into account in order to determine for each potential degraded configuration the incurred risk and of inferring therefrom whether the aircraft may be allowed to continue to fly or not.

Figure 2:
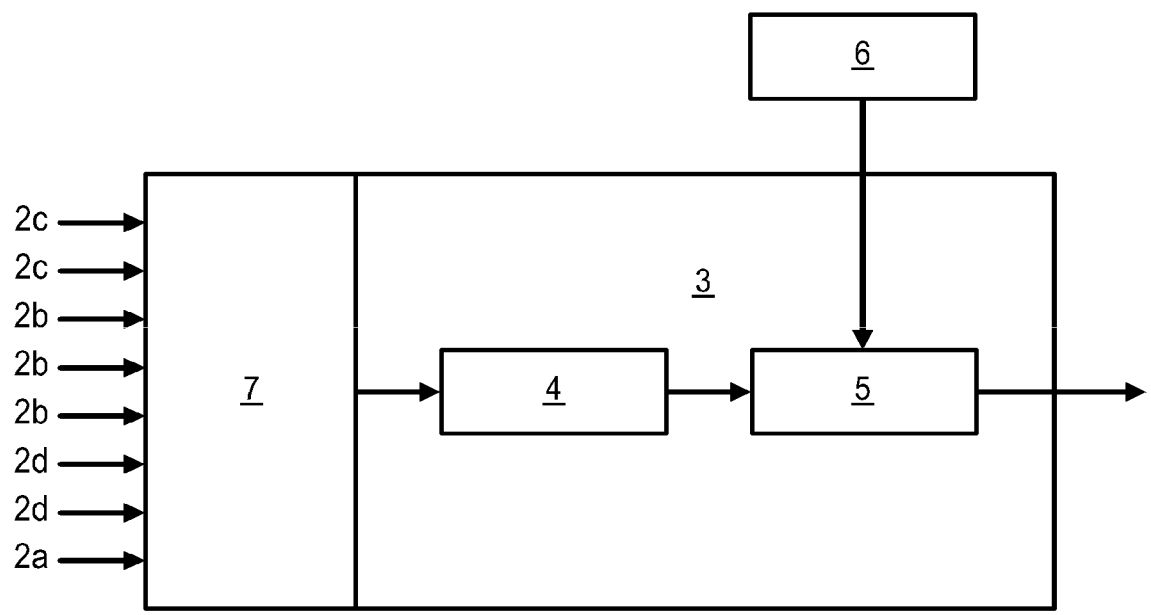
FIG. 2 illustrates an example of an architecture comprising a system for monitoring the operation of a turbomachine TLD ("Time Limited Dispatch") for applying the method according to the invention.

For this, the aircraft is provided with a system for monitoring the operation of a turbomachine TLD ("Time Limited Dispatch") 3 illustrated in FIG. 2 and which may be totally or partly included in the digital regulation system 1. The TLD system has the function of giving in real time an estimation of the authorized flight time according to the current configuration, whether it is sound or degraded. The authorized operation time is determined by the TLD system on the basis of results of analyses of operation safety which evaluate the residual probability of occurrence of a feared event such as the Loss of Thrust Control (LOTC), defined as the state in which the thrust of the engine cannot be modulated by the control joystick of the thrust or when a loss of thrust oscillations greater than 10% occur. When the system is in a determined degraded configuration, its instantaneous LOTC probability increases with respect to the one corresponding to a faultless configuration in so far that certain functionalities are no longer available, for example in the case of loss of the velocity probe of the BP turbine of route A or of loss of the electric control of an actuator.

Depending on the value of such a probability, the current degraded configuration may be classified in a given operation category wherein a certain operation time remains authorized. The more the probability of the feared event increases, the more the current degraded configuration will be classified in a category allowing a short operation time, until the immobilization of the aircraft after its current mission is required in the higher category. A classification example is given in the appended table 1.

The TLD system is connected to various components of the regulation system via an acquisition module 7 and includes a failure detection module ("Build In Test Equipment" BITE) 4. This module may determine, from signals received from the components of the system acquired by the acquisition module 7, the failures exhibited by these components, and therefore the current degraded configuration. This module may also determine the failures of other components of the turbomachine. The components for which the failures are detected are preferentially components for which a failure does not make the turbomachine unusable, such as some of the actuators.

The TLD system also comprises a calculation module 5 able to determine a classification of the current degraded configuration. For this, the regulation system comprises a storage device 6 connected to the TLD system and storing at least one classification table associating with at least one degraded configuration a classification expressing the criticality level of said degraded configuration.

The elements of the TLD system may be totally or partly included in one or several digital regulation systems FADEC of the aircraft and/or in any other portion of the computer system of the aircraft. Certain pieces of computer equipment of the aircraft may both play the role of one or several elements of the TLD system and moreover ensure additional functions. These elements may also be distinct dedicated elements of other pieces of computer equipment of the aircraft and exclusively used for applying the functions of the TLD system.

Tables covering not only the degraded configurations having a simple failure but also certain configurations having multiple failures may be used. As an example, all or part of the configurations having two or three failures may be associated with a classification of criticality in these tables. An example of such tables is given in appendix 2.

The classification associated with a degraded configuration in these tables may be determined from a calculation of the exact probability of occurrence of the feared event LOTC in this degraded configuration, and not in an approximate way by application of conservatisms. Such a probability may be obtained by calculating a conditional probability of the feared event LOTC from the probability of occurrence of elementary events relative to a failure of one of said components of the regulation system.

Figure 3:
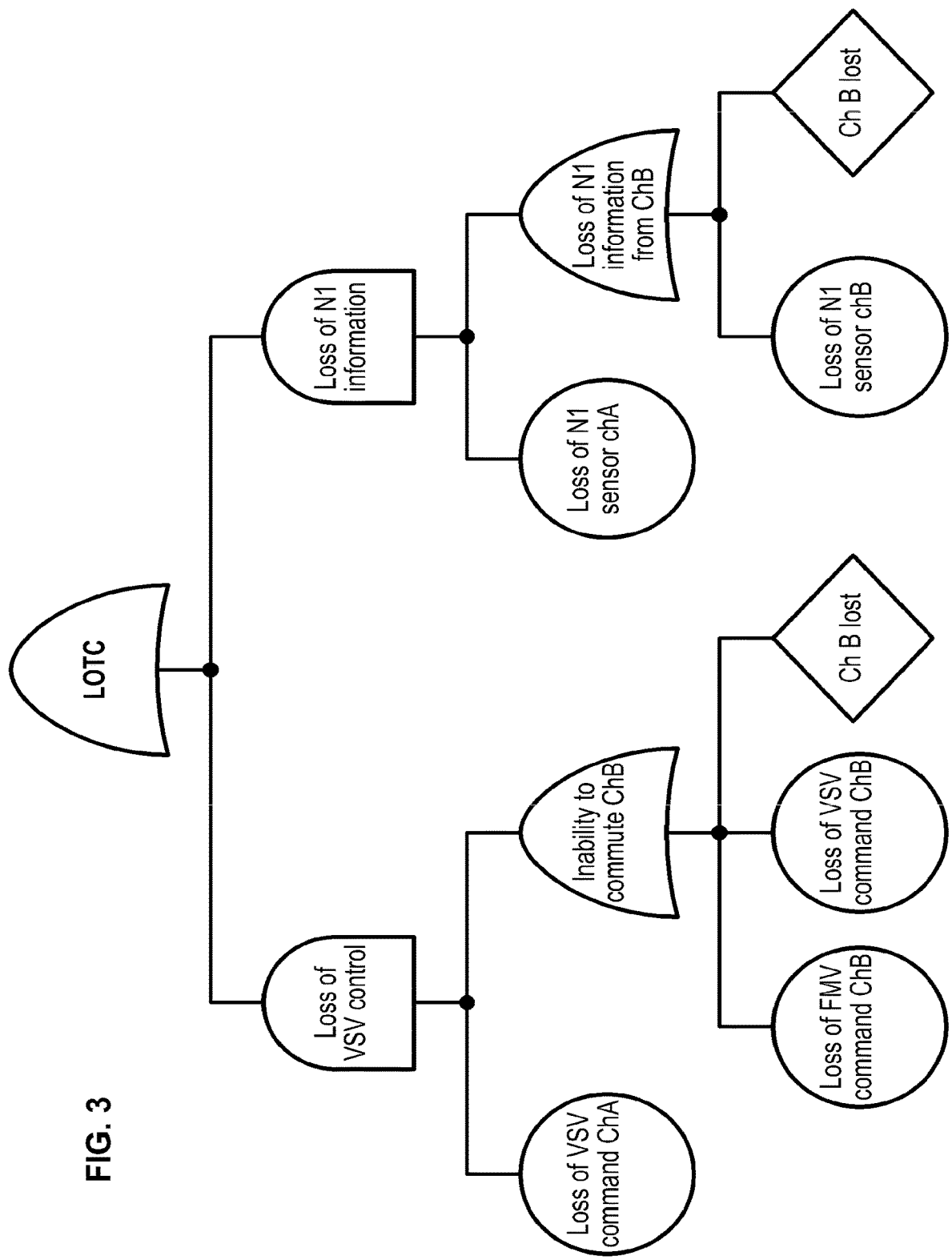
FIG. 3 illustrates an example of a failure tree for an application of the method according to the invention.
Figure 4:
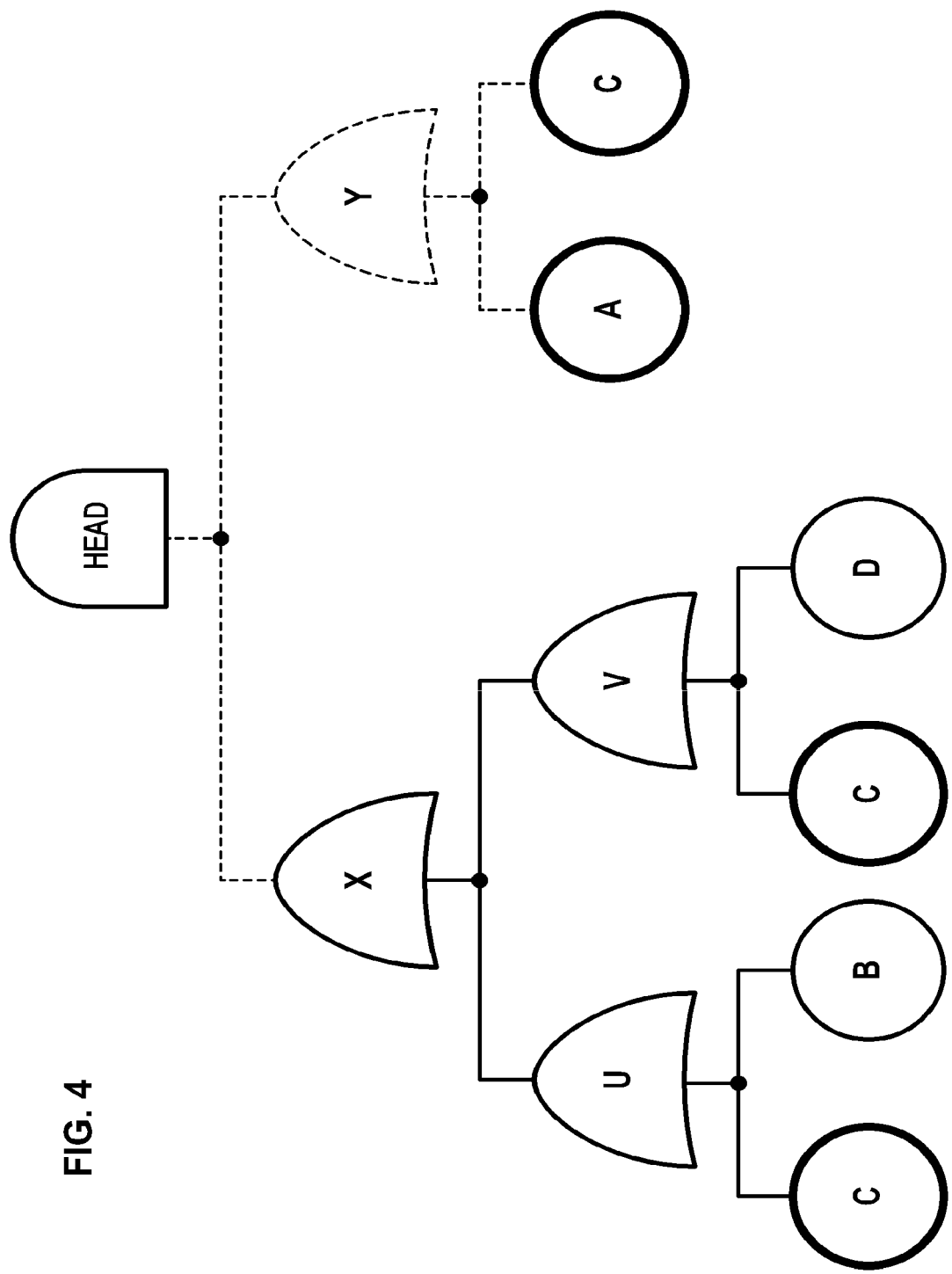
FIG. 4 illustrates another example of a failure tree for applying the method according to the invention.

Such a calculation of a conditional probability may be achieved by means of a failure tree as the one illustrated in FIG. 3. Such a tree graphically illustrates possible logic combinations of events leading to the achievement of said feared event LOTC. The leaves of such a tree, i.e. the nodes of a lower level of the tree without any son nodes, correspond to elementary events. These elementary events are relative to the failure of a component of the regulation system. In the example of FIG. 3, these elementary events are the loss of the control by route A of the actuators for adjusting the stators of the high pressure compressor (VSV), the loss of the control by the route B of the actuators for adjusting the stators of the high pressure compressor (VSV), the loss of the control by the route B of the metering actuators for the fuel ("Fuel Meter Valve" FMV), the loss by the route B or the route A of the sensor of the speed of the turbine BP (N1) and the loss of the route B. The other nodes of the tree correspond to events which may be expressed as a Boolean combination by means of logical gates of these elementary events. The top of the tree corresponds to the feared event LOTC. By means of such a tree, it is possible to calculate for each event corresponding to a node of the tree, i.e. to a combination of elementary events, the formula expressing the probability of this event depending on its son events in the tree. Such formulae may be calculated for all the nodes up to the route node corresponding to the LOTC event. The knowledge of these probabilities of the elementary events then gives the possibility of calculating the probability of occurrence of any event of the tree, including the LOTC event. As an example, by noting as "A" the probability of an event A, an event U corresponding to ((the event A) OR (the event B)), the events A and B being assumed to be independent, will have the formula U=A+B−A·B. As a complementary example, the formulae on the one hand of the events corresponding to the tree illustrated in FIG. 4 are given in the table in Appendix 3. It should be noted that, in such formulae, the exponents of the terms brought to an integer power greater than 1 may be suppressed. For example, a term in $A^2$ may be replaced with the term A. Indeed, a term in $A^2$ corresponds to a Boolean point of view at the combination of events ((event A) AND (event A)), of course equivalent to the event A for which the probability is "A".

Figure 5A:
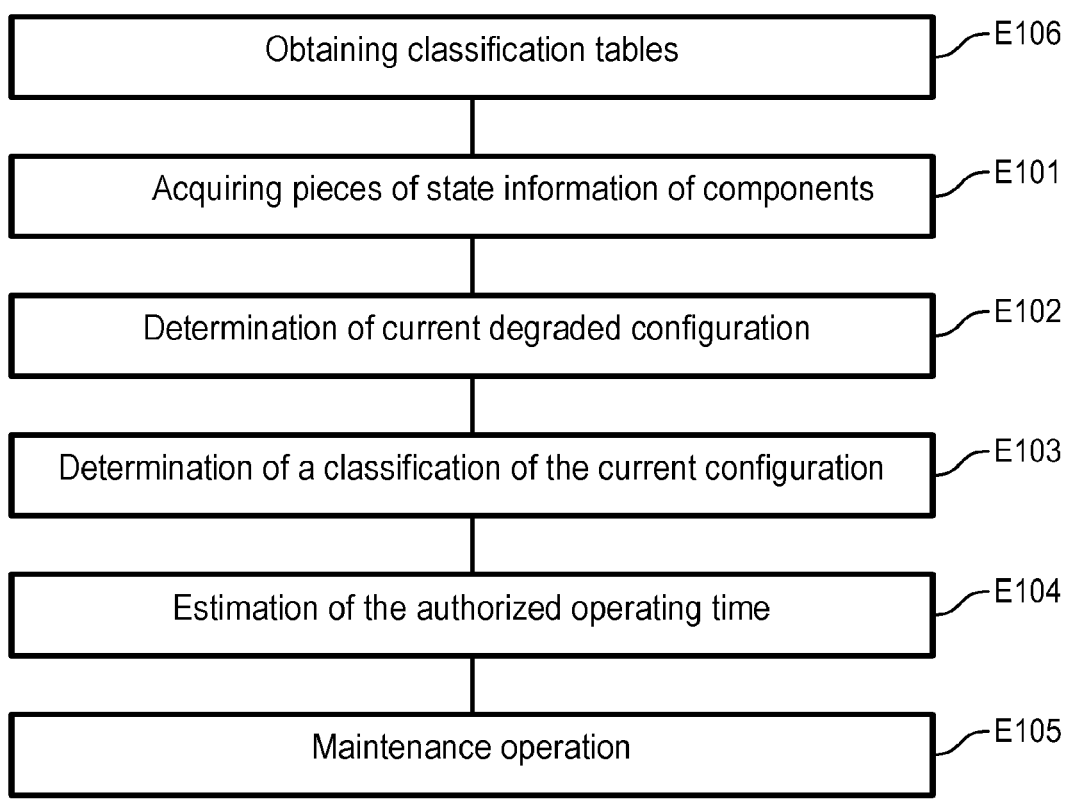
FIGS. 5a and 5b are diagrams schematizing an example for applying a method for monitoring the operation of a turbomachine according to the invention.

More specifically, with reference to the flow chart of FIG. 5a, during an acquisition step E101, the system acquires information on the operating state relatively to the state of said at least one component of the regulation system.

During a first determination step E102, the system determines according to the acquired state information, a current degraded configuration in which at least one of said components is faulty. Alternatively, if none of the components is faulty, the system determines a sound current configuration.

During a step for determining the classification E103, the system determines a classification of the current degraded configuration by means of at least one classification table stored in the storage device 6, said classification tables associating with at least one degraded configuration a classification expressing the criticality level of said degraded configuration, said tables being obtained by calculating a conditional probability of a predefined feared event LOTC from the probability of occurrence of elementary events relative to a failure of one of said components. Such tables may be calculated off-line by an outer system and be stored in the storage device 6 for subsequent use in flight.

During an estimation step E104, the system estimates an authorized operating time of the turbomachine according to the classification determined for the current degraded configuration.

A maintenance operation may be applied during a maintenance step E105 when the estimated authorized operating time is less than a predetermined threshold. For example a maintenance operation may be initiated once the aircraft has been returned to the ground if the regulation system has a combination of failures requiring immediate stopping, as far as possible, of the turbomachine, i.e. if during the estimation step, the authorized operating time of the turbomachine has been estimated as zero.

Classification tables associating a classification with each degraded configuration of a predefined set of degraded configurations, stored in the storage device and used during the step for determining the classification E103 may be obtained during a step for obtaining classification tables E106. This step for obtaining classification tables E106 may be applied off-line, prior to the application of the other steps of the method. This step may for example be applied by dedicated computing devices, on the ground, in the premises of the designer of the regulation system, before the take-off of the aircraft.

This step for obtaining classification tables E106 may comprise a modelling step E1061 during which a tree of failures is modeled, representing possible logical combinations of events leading to the achievement of the predefined feared event LOTC, the leaves of the tree representing said elementary events, as explained above.

Figure 5B:
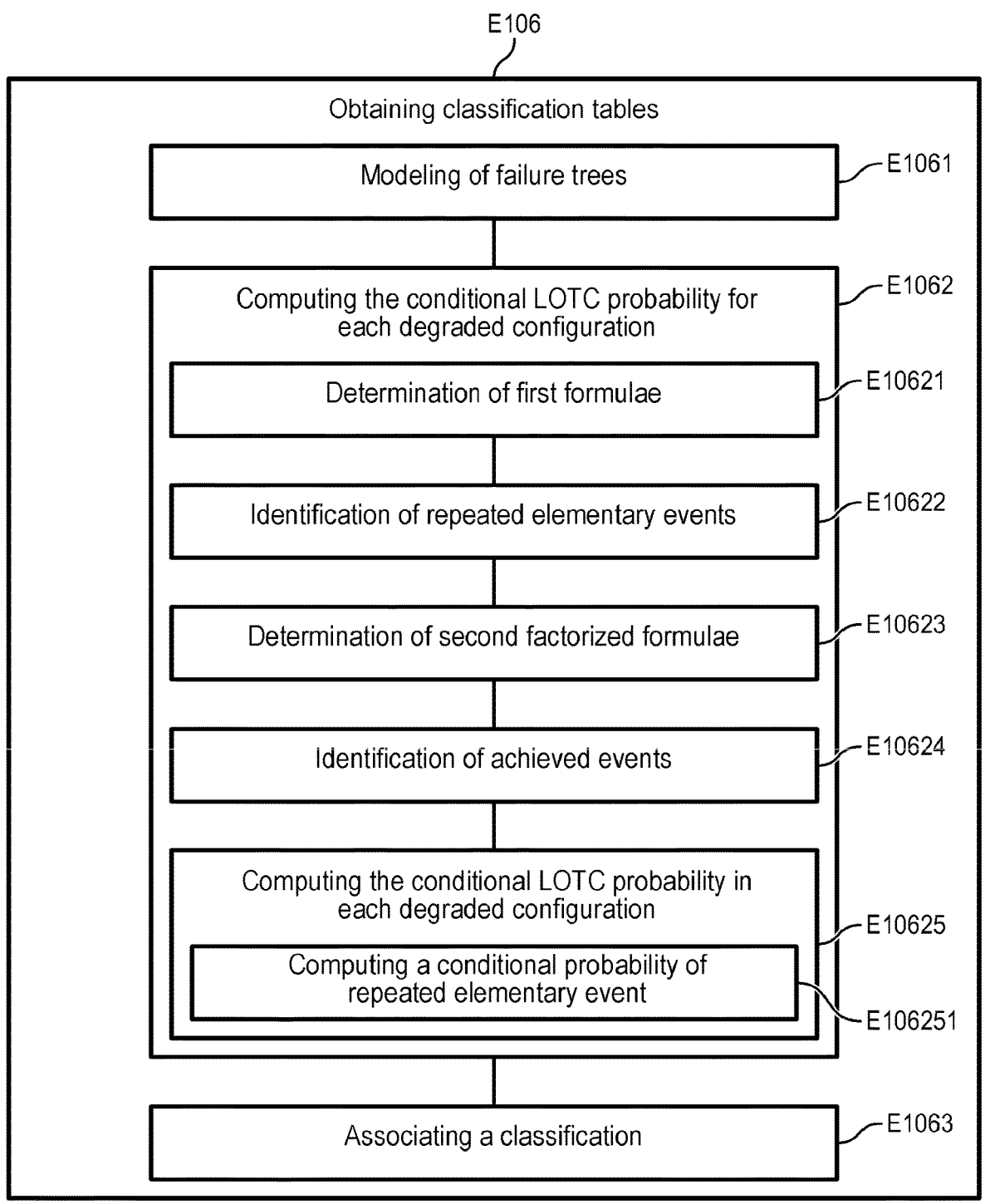

As illustrated in FIG. 5b, this step for obtaining classification tables E106 may also comprise, for each configuration of the predefined set of degraded configurations the taking into account in the classification tables during their generation:
  a first computing step E1062, from the probability of occurrence of elementary events, of the conditional probability in said degraded configuration of the predefined feared event,
  a step for associating E1063 in one of said tables of a classification with said degraded configuration according to the calculated conditional probability.

The calculation during the first step of calculation E1062 of a probability of an event according to the probability of occurrence of elementary events may be made complex by the fact that certain elementary events may be repeated in several branches of the tree. The different branches of the tree leading to the event for which the intention is to calculate the probability of occurrence are then no longer independent events. In order to simplify the calculation of probability under such circumstances, the first computing step E1062 may comprise for each event of the tree of failures representing a logic combination of son events of the tree:
  a step for determining first formulae E10621 during which a first formula is determined expressing the probability of this event according to said son events,
  a first step for identifying repeated events E10622 during which the repeated elementary events are determined in the tree from among the son events of said event, and
  a factorization step E10623, during which a second formula is determined, a so called factorized formula, by factorization of the first formula of said event according to identified repeated elementary events, each factorization term of said formula only depending on independent events of the factor with which it is associated.

The probabilities of the repeated elementary events at different locations of the tree thereby clearly appear in the formulae. The probability of an event associating two branches of the tree including elementary events at least partly identical may then be easily calculated.

As an example, the factorized formulae corresponding to a portion of the events of the tree of FIG. 4 are given in the table in Appendix 3. The repeated events of this tree are the events A and C. The probabilities of the events U and V may be expressed in a factorized form depending on the probabilities of the repeated events, i.e. according to A and C. By means of these factorized formulae, the factorized formula of the event X=U OR V may also be written in a factorized form depending on A and C. In all these formulae each factorization term only depends on independent events of the elementary events to which corresponds the factor. Thus, $U_A$, $X_A$ and $X_{Ac}$ only depend on the events B and D which are independent of A. The calculation of the probability of the root event of the tree from the probability of the event X will be facilitated since the latter already clearly shows the terms A, C and AC which will also be again found in the factorized formula expressing the probability of the event Y.

Figure 6:
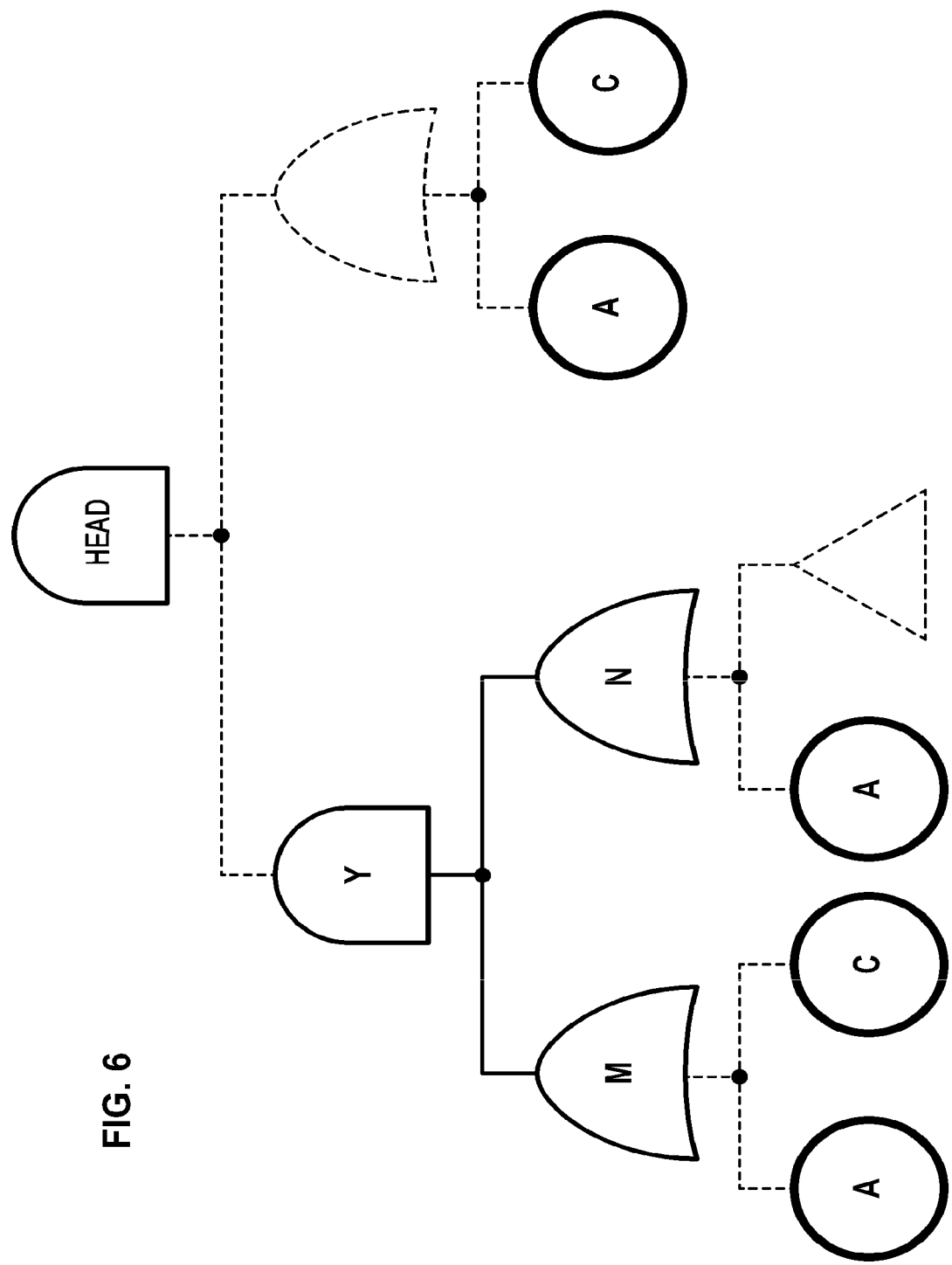
FIG. 6 illustrates another example of a failure tree for an application of the method according to the invention.

As a second example, the formulae corresponding to the events of the tree of FIG. 6 are given in the table in Appendix 4. The factorized formulae of the probabilities of the events M and N being already expressed according to the repeated elementary events A and C, it is simple to determine the factorized formula of the probability of event Y.

In order to limit the number of terms appearing in such formulae for retaining an acceptable computing time, it is possible to perform a truncation of the factorized formulae. For example, the terms corresponding to a product of a high number of elementary terms, more than four or five for example, may be suppressed from the formulae, as this is the case of a calculation of probability by truncation. Such terms actually correspond to the occurrence of as many failures simultaneously and therefore have low probability.

The first computing step E1062 may also comprise a second identification step E10624 during which the events of the tree produced in the degraded configuration are identified for which the conditional probability of the predefined feared event has to be calculated, and a second computing step E10625 during which the conditional probability of the predefined feared event in said degraded configuration is computed from said factorized formulae, from identified achieved events, and from probabilities of the elementary events.

Figure 7:
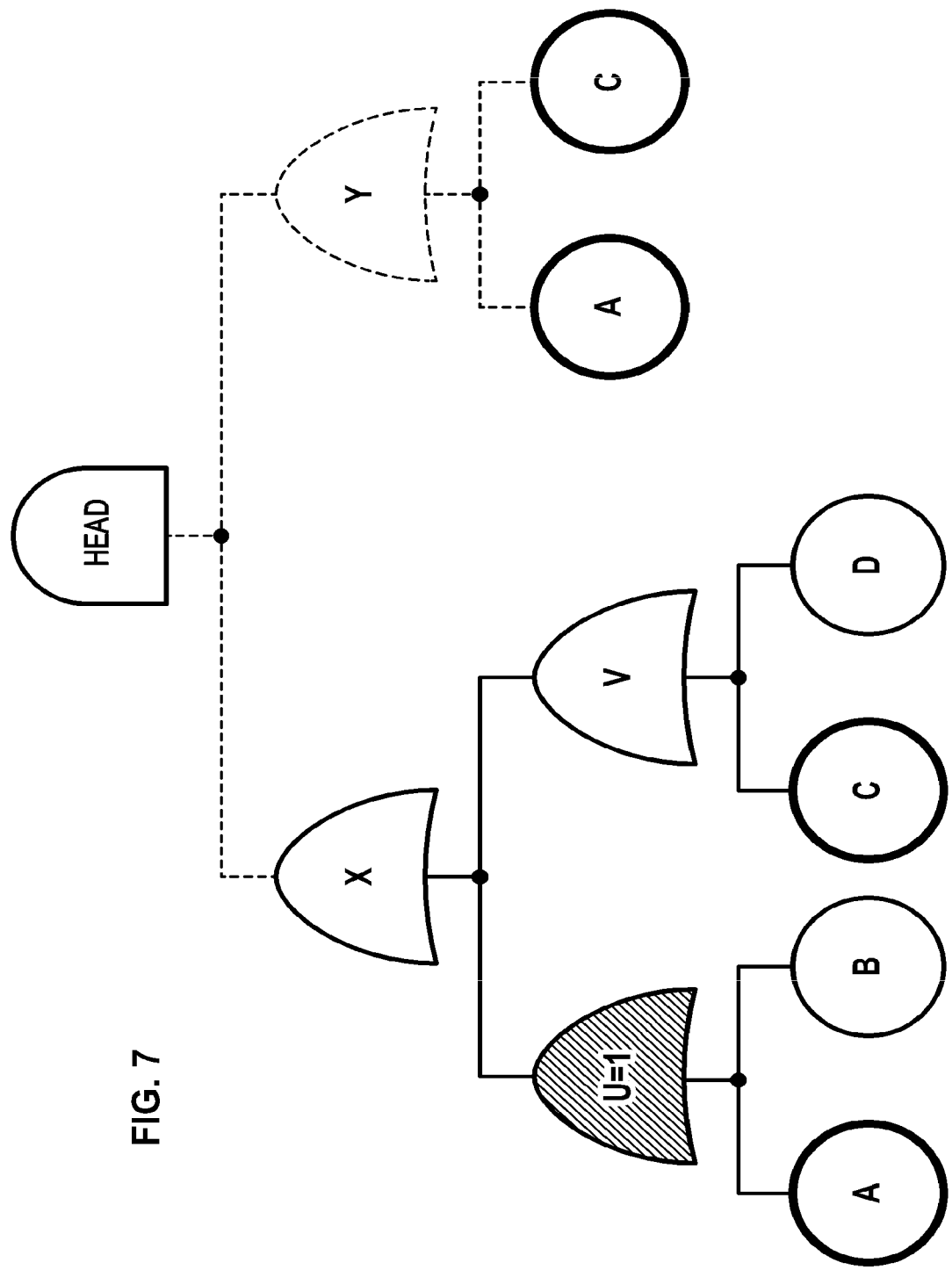
FIG. 7 illustrates another example of a failure tree for application of the method according to the invention wherein an event U is achieved.

As an example, in the case of the tree illustrated in FIG. 4, when the degraded configuration for which computation is intended of a conditional probability of the feared event consist in that the event U is achieved, the relevant events in the tree are identified, as illustrated on the tree in FIG. 7. The conditional probability of the other events of the tree is then calculated by taking into account the fact that the event U is achieved, i.e. that its probability is equal to 1. The formulae corresponding to certain of the events of the tree represented in FIG. 7 are given in the table in Appendix 5. Since U=1, it is possible to set $U_A$=0 and $U_0$=1. The factorization terms of the formula of X may then be re-computed and the probability of X with knowledge of U has the value 1.

Further, the second computing step E10625 may comprise, for at least one identified achieved event in a degraded configuration, a third computing step E106251 during which the conditional probability in said degraded configuration of at least one repeated elementary event in the tree from among the son events of said achieved event is computed by means of the factorized formula corresponding to said achieved event. The fact that an event is achieved modifies the probabilities of the elementary events having been able to lead to the achieved event. This is particularly important in the case of repeated elementary events since their probability will be used for calculating the probability of events other than the achieved event.

As an example, in the case of the tree illustrated in FIG. 7, the formulae of which are given in the table in Appendix 5, the formula of A may be re-computed by taking into account the fact that U=1, by means of the factorized formula for U. The probability of A with the knowledge of U may then be used for calculating the probability of Y with knowledge of U.

At the end of the first computing step E1062, during the association step E1063, the conditional probability in said degraded configuration of the calculated predefined feared event is compared with one or several criteria, such as those shown in appendix 1, and this degraded configuration is associated with an adequate classification in one of the classification tables.

At the end of step E106, a set of tables associating with diverse potential degraded configurations a classification expressing the criticality level of said degraded configuration is therefore obtained, such as the one illustrated in Appendix 2. These tables may be stored in a storage device and used during the step for determining the classification E103 for determining the classification of a current degraded configuration.

More specifically, said storage device may comprise a first number of classification tables, and for each of these tables all the configurations of a table may comprise the same number of faulty components. As an example, the storage device may store N tables respectively corresponding to degraded configurations with a simple failure, two simultaneous failures, . . . , M simultaneous failures, M being able to be equal to N or different.

The step for determining the classification E103 may then comprise, for the current degraded configuration, in which a plurality of components, so called current faulty components, are faulty, the search from among said tables, by covering the latter with increasing order of the number of faulty components, of the degraded configuration associated with a classification expressing a set maximum criticality level wherein the smallest number of components from among the current faulty components are faulty.

When the number of faulty components increases, the number of possible corresponding degraded configurations also increases and the size of the corresponding tables therefore increases rapidly with the increase in the number of failing components if they take into account all the possible degraded configurations. In order to limit the time required for determining the classification of the current degraded configuration, it is thus searched to determine whether a sub-set of the faulty components is associated with a maximum criticality level, by beginning with the smallest tables, i.e. those corresponding to a small number of faulty components. If a sub-set of the faulty components is associated with the maximum criticality level, the covering of the corresponding table to the number of components of this sub-set is sufficient for determining whether the current configuration is associated with the maximum criticality level and the tables corresponding to more faulty components do not need to be covered.

Figure 8:
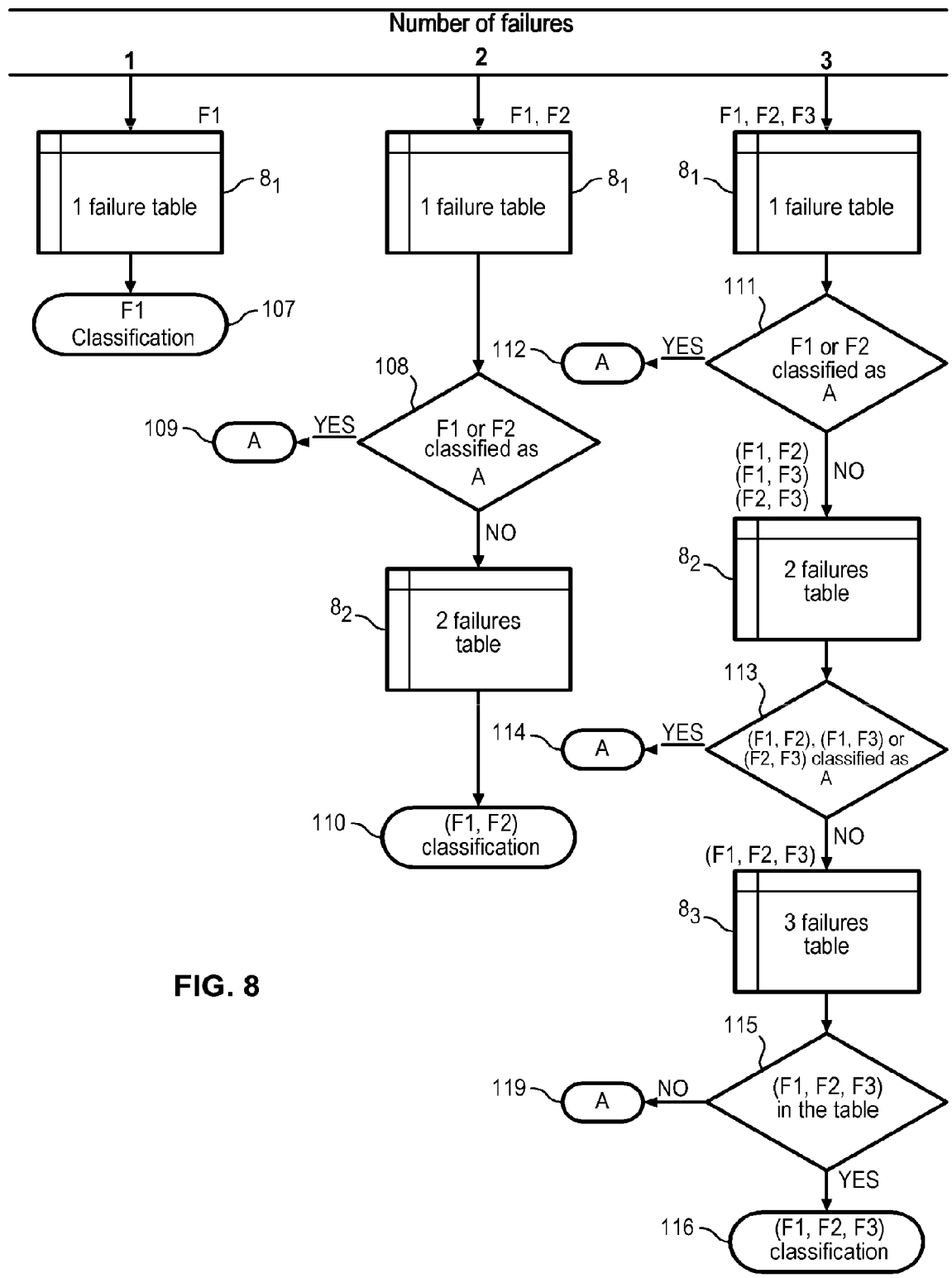
FIG. 8 illustrates a first embodiment of the step for determining the classification according to the invention.

As an example, as illustrated in FIG. 8, a first table $8_1$ comprises configurations with 1 faulty component, a second table $8_2$ comprises configurations with 2 faulty components, a third table $8_3$ comprises configurations with 3 faulty components. When a single component is faulty, corresponding to a failure F1, the classification associated with this configuration is sought 107 in the first table $8_1$. When the current degraded configuration comprises two faulty components, corresponding to the two failures F1 and F2, the first table $8_1$ is first of all covered for determining 108 whether a configuration having the failure F1 or the failure F2 is associated with the classification A expressing a maximum criticality level. If this is the case, the current degraded configuration having failures F1 and F2 may be associated 109 with the classification A without the need of covering the second table $8_2$. Otherwise, the second table $8_2$ is covered for searching therein for the classification associated with the configuration having the failures F1 and F2 110. Similarly, when the current degraded configuration comprises three faulty components, corresponding to three failures F1, F2 and F3, the first table $8_1$ is first of all covered for determining 111 whether a configuration having the failure F1, F2 or F3 is associated with the classification A 112. If this is not the case, the second table $8_2$ is then covered for determining 113 whether a configuration having a combination of two failures from among the failures F1, F2 and F3 is associated with the classification A 114. If this is not the case, the third table $8_3$ is finally covered for searching therein 115 the classification associated with the configuration having the failures F1, F2 and F3 116.

Figure 9:
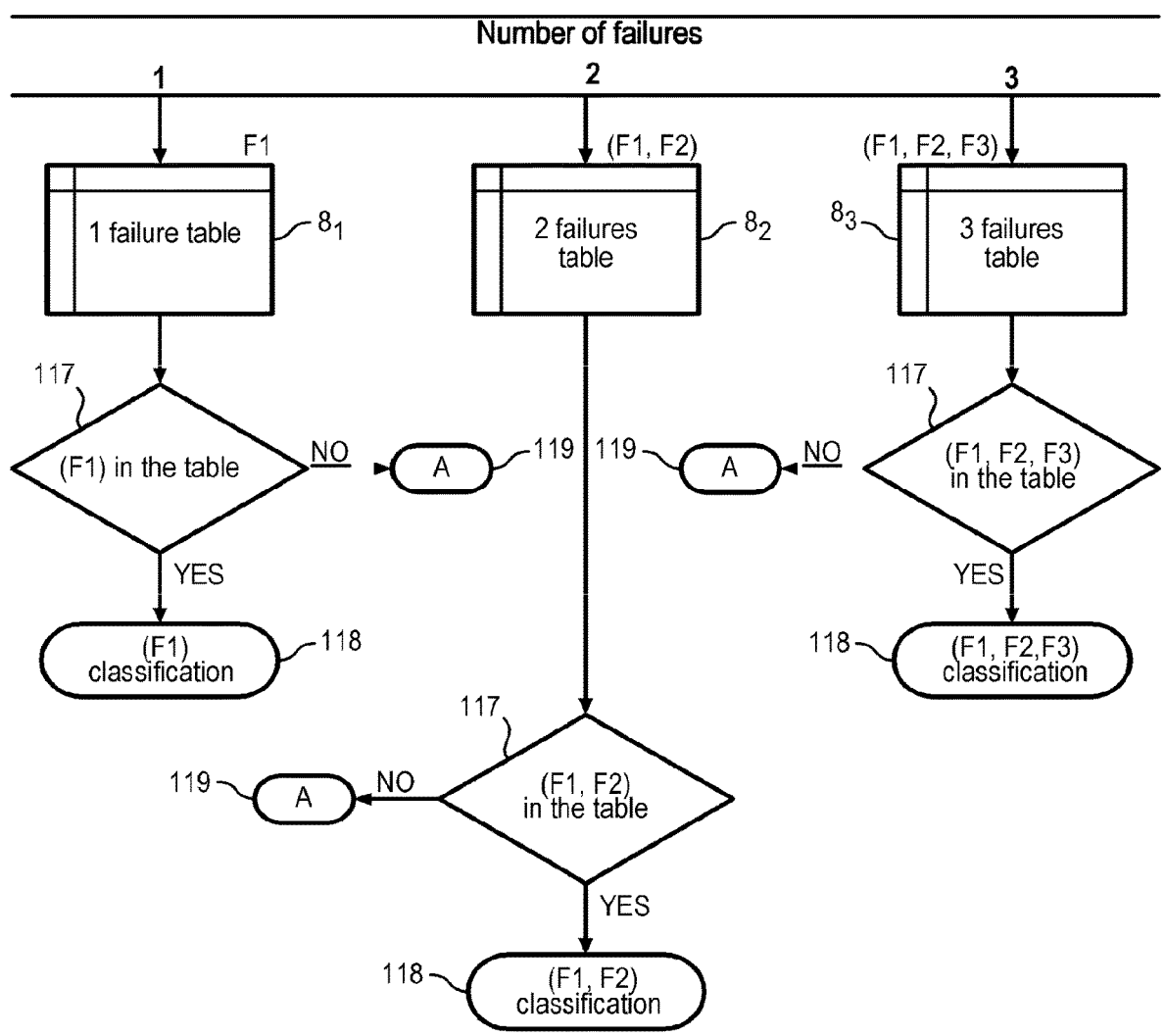
FIG. 9 illustrates a second embodiment of the step for determining classification according to the invention.

The step for determining the classification E103 may also comprise, for the current degraded configuration, in which a plurality of components, so called current faulty components, are faulty, the determination of the classification 118 associated with the current degraded configuration in the table associating a classification with degraded configurations comprising the same number of faulty components as the number of current faulty components. As an example, as illustrated in FIG. 9, if the current configuration has P failures, its classification may be sought 117 in the corresponding table to the degraded configurations with P failing components. Such a search may be applied directly instead of covering the tables in an increasing order of the number of faulty components as indicated above, or else such a search may be carried out when the search with an increasing order of the number of faulty components in the tables corresponding to 1 to P-1 failures has not given the possibility of identifying a sub-set of faulty components associated with the maximum criticality level.

Such a method may be applied to a current configuration comprising more than one faulty component, for example two faulty components. The storage device then notably comprises a table of classification of the configurations with three failures giving the possibility of determining in a specific way the classification of current degraded configurations with two failures. The method according to the invention thereby gives the possibility of obtaining a very accurate classification of the multi-failure degraded configurations with more than one failure while such a determination was up till now only allowed by the existing methods.

If none of said tables associates a classification with the current degraded configuration, the classification expressing a maximum criticality level may be associated 119 with said current degraded configuration. In the absence of information on the criticality of the failures of the current configuration, the maximum criticality level may then be retained in a conservative way.

In order to minimize the size of the tables, a table corresponding to degraded configurations with N failures may only list degraded configurations with N faulty components such that no configuration for which the components are faulty is a sub-set of these N faulty components is not associated at the maximum criticality level in the other tables. As an example, if the degraded configuration corresponding to the faults of the components A AND B is associated with the maximum criticality level, it is unnecessary to associate a classification with the configurations in which at least three components for which the components A and B are faulty, in the corresponding tables with three or more failures. Covering the table corresponding to configurations with two failures is sufficient for determining whether all these configurations for which the components A and B are faulty, will also be associated with the maximum criticality level.

Thus, the probability of occurrence of a feared event for a plurality of possible failures may be specifically and rapidly computed, including for degraded configurations having multiple failures, and in a reduced computing time, in order not to require an interruption of the flight of the aircraft for maintenance only in strictly required delays.

APPENDIX 1

| Configuration | Instantaneous LOTC probability | Authorized operating time | Classification of the configuration |
|---|---|---|---|
| Degraded | LOTC > 10 * $10^{-4}$/h | 0 h | A |
| | 7.5 * $10^{-5}$/h < LOTC < 10 * $10^{-5}$/h | 125 h | B |
| | $10^{-5}$/h < LOTC < 7.5 * $10^{-5}$/h | 250 h | C |
| | LOTC ≤$10^{-5}$/h | Unlimited | D |
| Sound | LOTC ≤$10^{-5}$/h | Unlimited | — |

APPENDIX 2

| | Classification |
|---|---|
| Single failure | |
| N1 | C |
| N2 | C |
| Actuator for variable adjusting of the stator | B |
| Actuator of the fuel injection flow rate ("Weighted fuel Flow" WF) | B |
| Dual failure | |
| (VSV act) both routes | A |
| (N1) both routes | A |
| (WF act, VSV act) different routes | A |
| (N1, N2) same route | B |
| (N1, N2) different routes | B |
| (N1, VSV act) same route | B |
| ... | ... |
| Triple failure | |
| (VSV act, WF act, N1) same route | B |

APPENDIX 3

| Node | Repeated descending nodes | Non-developed formula | Factorized formula | Factors |
|---|---|---|---|---|
| U | A | U = A + B − AB | $U = \mathcal{U}_A A + \mathcal{U}_0$ | $\mathcal{U}_A = 1 − B$ <br> $\mathcal{U}_0 = B$ |
| V | C | V = C + D − CD | $V = \mathcal{V}_C C + \mathcal{V}_0$ | $\mathcal{V}_C = 1 − D$ <br> $\mathcal{V}_0 = D$ |
| X | A, C | X = U + V − UV | $X = X_A A + X_C C + X_{AC} AC + X_0$ | $X_A = (1 − \mathcal{V}_0)\mathcal{U}_A$ <br> $X_C = (1 − \mathcal{U}_0)\mathcal{V}_C$ <br> $X_{AC} = \mathcal{U}_A \mathcal{V}_C$ <br> $X_0 = \mathcal{U}_0 + \mathcal{V}_0 − \mathcal{U}_0 \mathcal{V}_0$ |

APPENDIX 4

| Node | Non-developed formula | Factorized formula |
|---|---|---|
| M | M | $M = \mathcal{M}_A A + \mathcal{M}_C C + \mathcal{M}_{AC} AC + \mathcal{M}_0$ |
| N | N | $N = \mathcal{N}_A A + \mathcal{N}_0$ |
| Y | Y = M, N | $X = (\mathcal{M}_A \mathcal{N}_A + \mathcal{M}_A \mathcal{N}_0 + \mathcal{M}_0 \mathcal{N}_A)A +$ |
|   |   | $(\mathcal{M}_C \mathcal{N}_A + \mathcal{M}_{AC} \mathcal{N}_0 + \mathcal{M}_{AC} \mathcal{N}_A)AC +$ |
|   |   | $\mathcal{M}_C \mathcal{N}_0 C +$ |
|   |   | $\mathcal{M}_0 \mathcal{N}_0$ |

APPENDIX 5

| Node | Formula | Particular action | Probability |
|---|---|---|---|
| U | $U = \mathcal{U}_A A + \mathcal{U}_0$ | Is forced to $P_\mathcal{U}(U_A) = 0$ and $P_\mathcal{U}(U_0) = 1$ | $\mathbb{P}_\mathcal{U}(U) = 1$ |
| V | $V = \mathcal{V}_C C + \mathcal{V}_0$ | U and V are independent. | $\mathbb{P}_\mathcal{U}(V) = \mathbb{P}(V)$ |
| X | $X = \mathcal{X}_A A + \mathcal{X}_C C + \mathcal{X}_{AC} AC + \mathcal{X}_0$ | $P_\mathcal{U}(U_A) = 0$ and $P_\mathcal{U}(U_0) = 1$ implies: $P_\mathcal{U}(X_A) = P_\mathcal{U}(X_C) = P_\mathcal{U}(X_{AC}) = 0$ and $P_\mathcal{U}(X_0) = 1$ | $P(X|U) = 1$ |
| A | — | As U was factorized according to A: $AU = U_A A + U_0 A$. | $P_U(A) = P(A \cap U)/P(U)$ $\mathbb{P}_U(A) = \dfrac{\mathbb{P}(\mathcal{U}_A)\mathbb{P}(A) + \mathbb{P}(\mathcal{U}_0)\mathbb{P}(A)}{\mathbb{P}(\mathcal{U}_A)\mathbb{P}(A) + \mathbb{P}(\mathcal{U}_0)}$ |
| B | — | B is not a factor of the formula of U. |   |

The invention claimed is:

1. A method for monitoring an operation of a turbomachine controlled by a digital regulation system comprising at least one component, the method comprising:
   acquiring state information on the operation related to a state of at least one component of a plurality of components;
   determining from the acquired state information a current degraded configuration wherein at least one of said components is faulty;
   determining a classification of said current degraded configuration by at least one classification table stored in a storage device, said classification table associating with at least one degraded configuration a classification expressing a criticality level of said degraded configuration, said classification table being obtained by calculating a conditional probability in a degraded configuration of a predefined feared event from the probability of occurrence of elementary events relative to a failure of one of said components; and
   estimating an authorized operating time of said turbomachine according to said classification determined for said current degraded configuration,
   wherein obtaining said classification table associating a classification with each degraded configuration of a predefined set of degraded configurations comprises:
      modeling a failure tree illustrating possible logic combinations of events leading to achievement of said predefined feared event, leaves of the failure tree illustrating said elementary events,
      for each degraded configuration of said predefined set, calculating, from the probability of occurrence of elementary events, the conditional probability in said degraded configuration of said predefined feared event, and
      for each degraded configuration of said predefined set, associating in one of said at least one classification table a classification with said degraded configuration according to the computed conditional probability,
   and wherein the calculation of the conditional probability of the predefined feared event in a degraded configuration comprises:
      for each event of the failure tree illustrating a logic combination of son events of the failure tree, determining a first formula expressing the probability of this event according to said son events, identifying repeated elementary events in the failure tree from among said son events and determining a second formula by factorization of said first formula according to the identified repeated elementary events, each factorization term of said second formula only depending on independent events of the factor with which it is associated,
      identifying in the failure tree events achieved in said degraded configuration, and
      calculating the conditional probability of the predefined feared event in said degraded configuration from said second formula, of the identified achieved events, and from probabilities of the elementary events.

2. The method according to claim 1, further comprising applying at least one maintenance operation when the authorized operating time is less than a predetermined threshold.

3. The method according to claim 1, further comprising truncating the second formula.

4. The method according to claim 1, wherein calculating the conditional probability of the predefined feared event in a degraded configuration comprises, for an identified achieved event, calculating a conditional probability in said degraded configuration of at least one repeated elementary event in the failure tree from among the son events of said achieved event, by the second formula corresponding to said achieved event.

5. The method according to claim 1, wherein said storage device comprises a first number of classification tables and, for each of these tables, all the configurations of the table comprises a same number of faulty components,
   wherein in said current degraded configuration a plurality of components, referred to as current faulty components, are faulty,
   wherein determining a classification of said current degraded configuration comprises searching, in said tables, by scanning the tables in an increasing order for the number of faulty components, of the degraded configuration associated with a classification expressing a set maximum criticality level and comprising a smallest number of components from the current faulty components which are faulty.

6. The method according to claim 1, wherein said storage device comprises a first number of classification tables and, for each of these tables all the configurations of the table comprises the same number of faulty components,
wherein in said current degraded configuration a plurality of components, referred to as current faulty components, are faulty,
wherein determining a classification of said current degraded configuration comprises determining the classification associated with the current degraded configuration in the table which associates a classification with degraded configurations comprising the same number of faulty components as the number of current faulty components.

7. The method according to claim 6, wherein, during determining a classification of said current degraded configuration, if none of said tables is associated with a classification with the current degraded configuration, the classification expressing a maximum criticality level is associated with said current degraded configuration.

8. A non-transitory computer-readable storage medium including computer executable instructions, wherein the instructions, when executed by a computer, cause the computer to perform a method for monitoring an operation of a turbomachine, the method comprising:
acquiring state information on the operation related to a state of at least one component of a plurality of components;
determining from the acquired state information a current degraded configuration wherein at least one of said components is faulty;
determining a classification of said current degraded configuration by at least one classification table stored in a storage device, said classification table associating with at least one degraded configuration a classification expressing a criticality level of said degraded configuration, said classification table being obtained by calculating a conditional probability in a degraded configuration of a predefined feared event from the probability of occurrence of elementary events relative to a failure of one of said components; and
estimating an authorized operating time of said turbomachine according to said classification determined for said current degraded configuration,
wherein obtaining said classification table associating a classification with each degraded configuration of a predefined set of degraded configurations comprises:
modeling a failure tree illustrating possible logic combinations of events leading to achievement of said predefined feared event, leaves of the failure tree illustrating said elementary events,
for each degraded configuration of said predefined set, calculating, from the probability of occurrence of elementary events, the conditional probability in said degraded configuration of said predefined feared event, and
for each degraded configuration of said predefined set, associating in said at least one classification table a classification with said degraded configuration according to the computed conditional probability,
and wherein the calculation of the conditional probability of the predefined feared event in a degraded configuration comprises:
for each event of the failure tree illustrating a logic combination of son events of the failure tree, determining a first formula expressing the probability of this event according to said son events, identifying repeated elementary events in the failure tree from among said son events and determining a second formula by factorization of said first formula according to the identified repeated elementary events, each factorization term of said second formula only depending on independent events of the factor with which it is associated,
identifying in the failure tree events achieved in said degraded configuration, and
calculating the conditional probability of the predefined feared event in said degraded configuration from said second formula, of the identified achieved events, and from probabilities of the elementary events.

9. A system for monitoring the operation of a turbomachine controlled by a digital regulation system comprising at least one component, the system comprising:
circuitry configured to
acquire operating state information related to a state of at least one component of a plurality of components,
determine from the acquired state information a current degraded configuration wherein at least one of said components is faulty,
determine a classification of said current degraded configuration by at least one classification table stored in a storage device, said classification table associating with at least one degraded configuration a classification expressing a criticality level of said degraded configuration, said classification table being obtained by calculating a conditional probability in a degraded configuration of a predefined feared event from the probability of occurrence of elementary events relative to a failure of one of said components, and
estimate an authorized operating time of said turbomachine according to said classification determined for said current degraded configuration,
wherein obtaining said classification table associating a classification with each degraded configuration of a predefined set of degraded configurations comprises:
modeling a failure tree illustrating possible logic combinations of events leading to achievement of said predefined feared event, leaves of the failure tree illustrating said elementary events,
for each degraded configuration of said predefined set, calculating, from the probability of occurrence of elementary events, the conditional probability in said degraded configuration of said predefined feared event, and
for each degraded configuration of said predefined set, associating in said at least one classification table a classification with said degraded configuration according to the computed conditional probability,
and wherein the calculation of the conditional probability of the predefined feared event in a degraded configuration comprises:
for each event of the failure tree illustrating a logic combination of son events of the failure tree, determining a first formula expressing the probability of this event according to said son events, identifying repeated elementary events in the failure tree from among said son events and determining a second formula by factorization of said first formula according to the identified repeated elementary events, each factorization term of said second formula only depending on independent events of the factor with which it is associated, identifying in the failure tree events achieved in said degraded configuration, and calculating the conditional probability of the predefined feared event in said degraded configuration from said second formula, of the identified achieved events, and from probabilities of the elementary events.

\* \* \* \* \*

UNITED STATES PATENT AND TRADEMARK OFFICE
CERTIFICATE OF CORRECTION

PATENT NO. : 10,754,333 B2  
APPLICATION NO. : 15/531781  
DATED : August 25, 2020  
INVENTOR(S) : Augustin Marie Michel Descoqs et al.

Page 1 of 1

It is certified that error appears in the above-identified patent and that said Letters Patent is hereby corrected as shown below:

In the Specification

In Column 12, Lines 55-65, APPENDIX 3, delete "$V = V_{\cdot c}C + V_{\cdot 0}$" and insert -- $V = V_C C + V_0$ --, therefor.

In Column 12, Lines 55-65, APPENDIX 3, delete "$V_{\cdot c} = 1 - D$, $V_{\cdot 0} = D$" and insert -- $V_C = 1 - D$, $V_0 = D$ --, therefor.

In Column 12, Lines 55-65, APPENDIX 3, delete "$X_A = (1 - V_{\cdot 0})U_A$" and insert -- $X_A = (1 - V_0)U_A$ --, therefor.

In Column 12, Lines 55-65, APPENDIX 3, delete "$X_{AC} = U_A V_C$, $X_0 = U_0 + V_0 - U_0 V_0$" and insert -- $X_{AC} = U_A V_C$, $X_0 = U_0 + V_0 - U_0 V_0$ --, therefor.

In Column 13, Line 8, APPENDIX 4, delete "M,N" and insert -- M.N --, therefor.

In the Claims

In Column 14, Line 2, Claim 1, delete "in one of" and insert -- in --, therefor.

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*